(12) United States Patent
Tsuji

(10) Patent No.: US 7,504,611 B2
(45) Date of Patent: Mar. 17, 2009

(54) MOVING OBJECT DETECTING PHOTOINTERRUPTER AND ELECTRONIC DEVICE USING THE SAME

(75) Inventor: Masaki Tsuji, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 71 days.

(21) Appl. No.: 11/653,944

(22) Filed: Jan. 17, 2007

(65) Prior Publication Data

US 2007/0170380 A1   Jul. 26, 2007

(30) Foreign Application Priority Data

Jan. 26, 2006   (JP) .............................. 2006-017921

(51) Int. Cl.
*G01B 11/26* (2006.01)

(52) U.S. Cl. ................ 250/206; 250/206.1; 250/559.33; 701/209

(58) Field of Classification Search ................. 340/555; 250/203.2, 206.1, 559.29, 559.33, 203.1; 701/209–211

See application file for complete search history.

(56) References Cited

U.S. PATENT DOCUMENTS

| | | | | |
|---|---|---|---|---|
| 5,601,255 A | * | 2/1997 | Romer et al. | ............... 244/3.13 |
| 5,647,559 A | * | 7/1997 | Romer et al. | ............... 244/3.13 |
| 5,661,555 A | * | 8/1997 | Romer et al. | ........... 356/139.03 |

FOREIGN PATENT DOCUMENTS

| | | |
|---|---|---|
| JP | 2001-318164 | 11/2001 |
| JP | 2002/57367 | 2/2002 |
| JP | 2003-126370 | 5/2003 |
| JP | 3644872 | 2/2005 |
| JP | 2006/71621 | 3/2006 |
| JP | 2006-136410 | 6/2006 |

* cited by examiner

*Primary Examiner*—Georgia Y Epps
*Assistant Examiner*—Tony Ko
(74) *Attorney, Agent, or Firm*—Nixon & Vanderhye P.C.

(57) ABSTRACT

A moving object detecting photointerrupter includes one light emitting element for emitting light, at least two light receiving elements for receiving and detecting light emitted from the light emitting element and reflected off a moving object, and a detecting programmed logic circuitry for detecting movement of the moving object based on detection output from the light receiving elements when the light reflected off the moving object is received.

19 Claims, 8 Drawing Sheets

MOVING OBJECT DETECTING PHOTOINTERRUPTER AND ELECTRONIC DEVICE USING THE SAME

BACKGROUND

This application claims priority under 35 U.S.C. § 119(a) on Patent Application No. 2006-017921 filed in Japan on Jan. 26, 2006, the entire contents of which are hereby incorporated by reference.

The technology presented herein relates to moving object detecting photointerrupters for detecting moving objects, and electronic devices using the same.

Previous examples of this type of apparatus include devices for detecting moving objects based on the detection output from a light receiving element when light is emitted from a light emitting element along a path of a moving object, and light reflected by the moving object that is moving on the path is received by the light receiving element (see, for example, JP 2001-318164A, JP 2002-57367A, and JP 2003-126370A).

There are also devices which make it possible to detect not only the presence of a moving object, but the movement of a moving object (the movement itself or the direction of movement). For example, there are devices in which two sensors 101 and 102 are arranged side by side as shown in FIG. 10 and FIG. 11. When a moving object 103 passes in front of the sensors 101 and 102 in sequence, the moving object 103 is detected by the sensors 101 and 102 one after the other, and the direction of the movement of the moving object 103 is detected based on the sequence of detection by the sensors 101 and 102. If the moving object 103 moves in the direction of arrow A, the moving object 103 is first detected by the sensor 101 and then the moving object 103 is detected by the sensor 102, thereby making it possible to detect that the moving object 103 is moving in the direction of arrow A based on the sequence of detection by the sensors 101 and 102.

The sensors 101 and 102 are each equipped with one set of a light emitting element and a light receiving element, as in the devices described in JP 2001-318164A, JP 2002-57367A, and JP 2003-126370A, for example, light being emitted from the light emitting element, light reflected by the moving object being received by the light receiving element, and the moving object being detected based on the light reception output of the light receiving element at this time.

Accordingly, if the moving object 103 moves in the direction of arrow A as shown in FIG. 10 and FIG. 11, and detection is performed first by the sensor 101, and then detection is performed by the sensor 102, the output from the light receiving element of the sensor 101 changes as shown in FIG. 12, the output from the light receiving element of the sensor 102 changes after the moving object 103 passes a fixed distance Δk, thereby making it possible to detect that the moving object 103 is moving in the direction of arrow A based on the sequence of changes in the detection output of the light receiving elements.

Nevertheless, two sensors 101 and 102 are conventionally provided in order to detect the direction of movement of the moving object, and therefore the number of parts doubles when compared to cases in which only the presence of a moving object is detected. Furthermore, since two sensors 101 and 102 are provided separately, providing a separate circuit for detecting the direction of movement of the moving object based on the output of the sensors 101 and 102 is necessary. Accordingly, simply detecting the direction of movement of the moving object entails an increase in the number of parts, greater structural complexity, greater design complexity, increased mounting space, greater complexity in assembly and tuning, increased costs, and so on.

Accordingly, the present technology has been devised in light of these conventional problems, and it is a feature thereof to provide a moving object detecting photointerrupter capable of detecting the direction of movement of a moving object and a device using the same, without involving an increase in the number of parts or the complexity of the structure, etc.

SUMMARY

In order to solve the problems, the moving object detecting photointerrupter of an example embodiment presented herein comprises one light emitting element for emitting light, at least two light receiving elements for receiving and detecting light emitted from the light emitting element and reflected off a moving object, and a detecting means for detecting movement of the moving object based on detection output from the light receiving elements when the light reflected off the moving object is received.

With this moving object detecting photointerrupter of the example embodiment, light emitted from the one light emitting element and reflected off a moving object is received by the two light receiving elements, and the movement of the moving object is detected based on the detection output from the light receiving elements. Accordingly, the number of light emitting elements decreases compared to conventional cases in which two pairs of light emitting elements and light receiving elements are used. With this reduction in the number of light emitting elements, suppressing a large size for the moving object detecting photointerrupter is possible even if the one light emitting element, the two light receiving elements, and the detecting means are combined into a single unit, making it easier to combine the moving object detecting photointerrupter into a single unit. It is therefore possible to suppress an increase in the number of parts, complexity of structure, complexity of design, an increase of installation space, complexity of assembly and tuning, an increase in cost, and so on.

Furthermore, in the example embodiment, the areas of light receiving regions of the light receiving elements may be made the same.

The amount of light received by the light receiving elements is thereby the same, making it possible to reduce variation in the detection output of the light receiving elements and to improve the detection precision of movement of the moving object based on the detection output of the light receiving elements.

Moreover, in the example embodiment, an optical system may be set for each of the light receiving elements in accordance with the area of the light receiving region of each of the light receiving elements.

This increases or adjusts the amount of light received by the light receiving elements, making it possible more reliably to receive light reflected off a moving object with the light receiving elements.

Furthermore, in the example embodiment, the light receiving elements may have a plurality of light receiving regions.

In this case, a plurality of light receiving regions is provided to each light receiving element, thereby making it possible to suppress variation in the detection output of the light receiving elements by obtaining an average value, etc., of the detection output from the light receiving regions.

Furthermore, in the example embodiment, the detecting means may obtain a difference in light reception start timings of the light receiving elements receiving light reflected off the moving object based on the detection output of the light receiving elements and detect movement of the moving object when the difference in the light reception start timings is equal to or greater than a prescribed value.

If the light receiving elements are arranged side by side along the direction of movement of the moving object, the light reflected off the moving object is received in sequence by the light receiving elements as the moving object moves, causing a difference to arise in the light reception start timings of the light receiving elements. Therefore, it is possible to judge that movement of the moving object has been detected when the difference in the light reception start timings is equal to or greater than a prescribed value.

Furthermore, in the example embodiment, the detecting means may obtain a difference in light reception start timings of the light receiving elements receiving light reflected off the moving object based on the detection output of the light receiving elements, and detect movement of the moving object when the difference in the light reception start timings falls within a prescribed range.

For the difference in the light reception start timings of the light receiving elements to fall in the prescribed range, the speed of the movement of the moving object must be within a fixed speed range. Accordingly, only the movement of a moving object moving within a fixed speed range is detected.

Moreover, the detecting means may detect the movement of the moving object based on the detection output of the light receiving elements regardless of the sequence of the light reception start timings of the light receiving elements receiving light reflected off the moving object.

Assuming that when the moving object is moving in one direction the light reflected off the moving object is received by one light receiving element and that the reflected light is thereafter received by the other light receiving element, then the sequence of reception of the reflected light by the light receiving elements is reversed when the moving object is moving in the reverse direction. Therefore, in a case in which detection is performed regardless of the sequence of the light reception start timings of the light receiving elements receiving reflected light, the direction of movement of the moving object is not detected, and only the movement is detected.

Furthermore, in the example embodiment, the detecting means may obtain the sequence of the light reception start timings of the light receiving elements receiving light reflected off the moving object based on the detection output of the light receiving elements, and detect the direction of movement of the moving object based on the sequence.

In this case, not only is the movement of the moving object detected, but the direction of movement too.

Furthermore, in the example embodiment, the detecting means may obtain the sequence of the light reception start timings of the light receiving elements receiving light reflected off the moving object based on the detection output of the light receiving elements, and detect movement of the moving object only when the sequence matches a prescribed sequence.

For example, assuming that when the moving object is moving in one direction, the sequence of the light reception start timings of the light receiving elements matches the prescribed sequence, then only movement in this one direction of the moving object is detected, and movement in the reverse direction is not detected.

Furthermore, in the example embodiment, the detecting means may obtain a difference in light reception end timings of the light receiving elements receiving light reflected off the moving object based on the detection output of the light receiving elements, and detect movement of the moving object when the difference in the light reception end timings is equal to or greater than a prescribed value.

Conversely, the detecting means may obtain a difference in light reception end timings of the light receiving elements receiving light reflected off the moving object based on the detection output of the light receiving elements, and detect movement of the moving object when the difference in the light reception end timings falls within a prescribed range.

Even using the difference in the light reception end timings of the light receiving elements in this way, the movement of the moving object can be detected the same as when using the difference in the light reception start timings.

Moreover, in the example embodiment, the detecting means may detect the movement of the moving object based on the detection output of the light receiving elements regardless of the sequence of the light reception end timings of the light receiving elements receiving light reflected off the moving object.

In a case in which detection is performed regardless of the sequence of the light reception end timings of the light receiving elements, the direction of movement of the moving object is not detected, and only the movement is detected.

Furthermore, in the example embodiment, the detecting means may obtain the sequence of the light reception end timings of the light receiving elements receiving light reflected off the moving object based on the detection output of the light receiving elements, and detect the direction of movement of the moving object based on the sequence.

In this case, not only is the movement of the moving object detected, but the direction of movement too.

Furthermore, in the example embodiment, the detecting means may obtain the sequence of the light reception end timings of the light receiving elements receiving light reflected off the moving object based on the detection output of the light receiving elements, and detect movement of the moving object only when the sequence matches a prescribed sequence.

In this case, only movement in one direction of the moving object is detected, and movement in the reverse direction is not detected.

Furthermore, in the example embodiment, the detecting means may obtain light reception start timings of the light receiving elements and light reception end timings of the light receiving elements receiving light reflected off the moving object based on the detection output of the light receiving elements, and detect movement of the moving object based on the light reception start timings and the light reception end timings.

The movement of the moving object may be detected by combining the difference in the light reception start timings and the light reception end timings of the light receiving elements in this way.

Furthermore, in the example embodiment, the detecting means may detect the movement of the moving object based on the detection output of the light receiving elements when light emitting timing of the light emitting element and light reception timings of the light receiving elements match continuously a plurality of times.

In this case, if light emitted from the light emitting element and reflected off the moving object is received by the light receiving elements, the light emitting timing of the light emitting element and the light reception timings of the light receiving elements match, and therefore it is assumed that the movement of the moving object is detected when the light emitting timing and the light reception timing match continuously a plurality of times. Moreover, when ambient light is received by the light receiving elements, the light emitting timing and the light reception timing will not match, and therefore it will not be assumed that movement of the moving object has been detected. In other words, movement of the moving object can be detected without being affected by ambient light.

Furthermore, in the example embodiment, the detecting means may maintain a detection state if a high-frequency light that does not match the light reception timing enters when the light emitting timing of the light emitting element and the light reception timings of the light receiving elements match.

In this case, even if high-frequency light in which the light emitting timing and the light reception timings do not match enters due to the effects of ambient light, the previous detection state by the detecting means is maintained, and therefore an incorrect detection state due to the effects of ambient light is not output.

Furthermore, in the example embodiment, the detecting means may not detect the movement of the moving object if a high-frequency light that does not match the light reception timing enters when the light emitting timing of the light emitting element and the light reception timings of the light receiving elements match.

In this case, when the light emitting timing and the light reception timings do not match due to the effects of ambient light, detection is not performed, by the detecting means, and therefore an incorrect detection state is not output due to the effects of ambient light.

Further, in the example embodiment, a collimating lens may be provided to the light-emitting side of the light emitting element or the light-incident side of the light receiving elements.

The collimating lens suppresses broadening of the light emitted from the light emitting element, thus making it possible to narrow the range of emission of light and achieve a brighter light image on the moving object, so as to more accurately detect the light reception timings of the light receiving elements, thereby improving detection precision of movement of the moving object based on the difference in the light reception timings of the light receiving elements, making detection easier.

An electronic device of the example embodiment presented herein uses the moving object detecting photointerrupter described above.

With this electronic device, the same action and effects as the moving object detecting photointerrupter of the example embodiment presented herein can be achieved.

Electronic devices include office automation equipment such as photocopiers, factory automation equipment, general household appliances, and so on.

DESCRIPTION OF THE PREFERRED EMBODIMENTS

Below follows a detailed description of embodiments with reference to the drawings.

Figure 1:
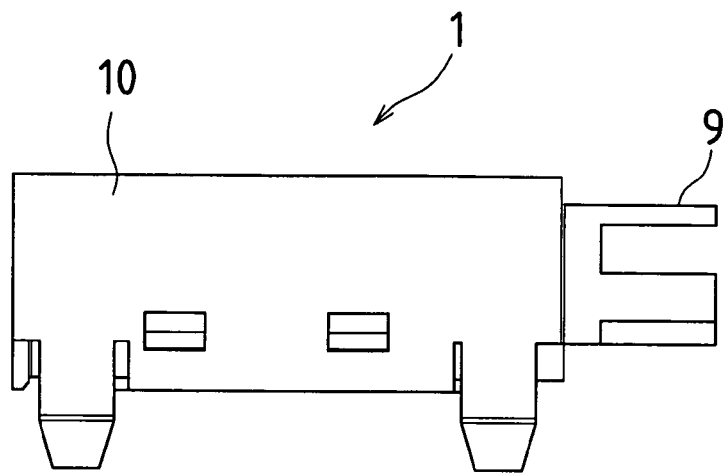
FIG. 1 is a side view showing an embodiment of a moving object detecting photointerrupter according to an example embodiment.
Figure 2:
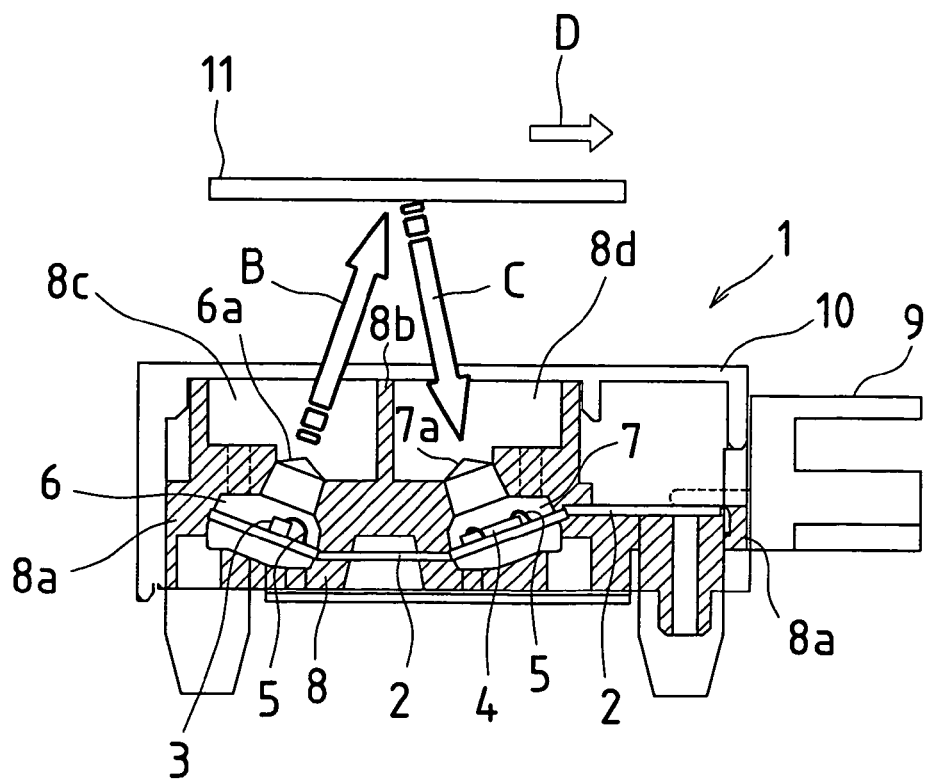
FIG. 2 is a cross-section showing the moving object detecting photointerrupter of FIG. 1.
Figure 3:
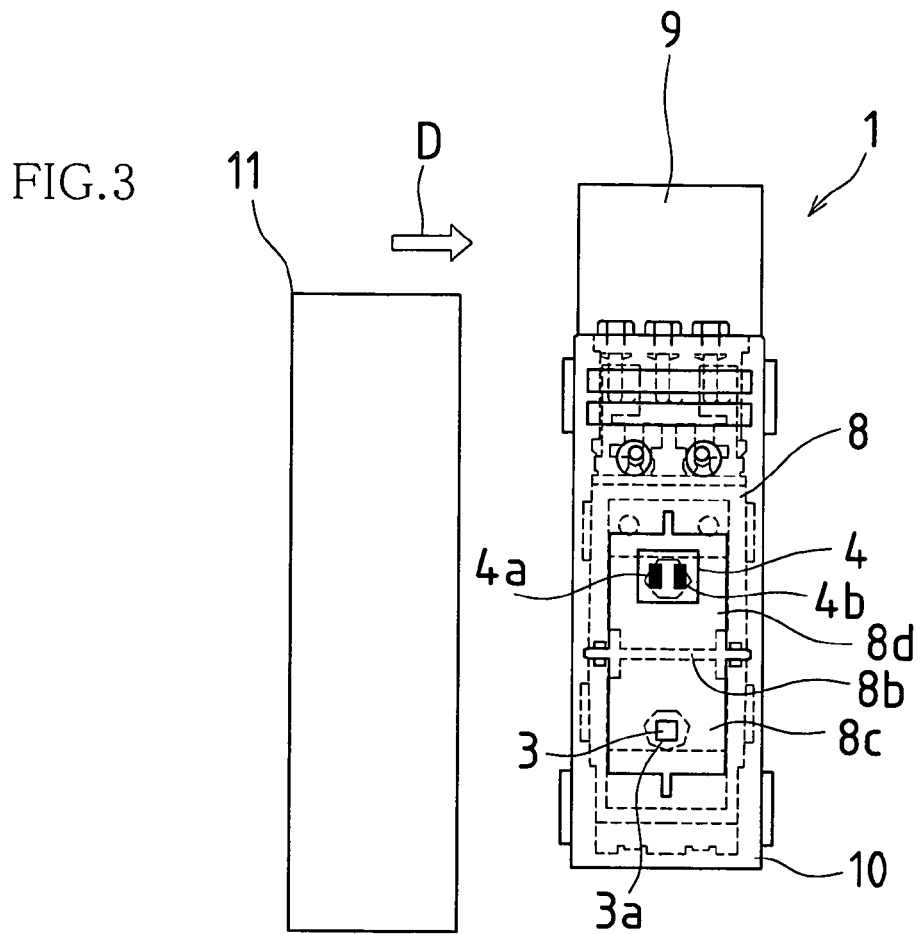
FIG. 3 is a plane view showing approximate relative positions of a light emitting chip and a light receiving chip in the moving object detecting photointerrupter of FIG. 1.

FIG. 1, FIG. 2, and FIG. 3 are a side view, a cross-section, and a plane view showing an embodiment of a moving object detecting photointerrupter. With a moving object detecting photointerrupter 1 of the present embodiment, a light emitting chip 3 and a light receiving chip 4 are mounted on lead frames 2, the light emitting chip 3 and the light receiving chip 4 being connected to the lead frames 2, etc., via respective wires 5. Translucent resins 6 and 7 are molded, the light emitting chip 3 and the light receiving chip 4 are sealed inside the translucent resins 6 and 7, respectively, an opaque resin case 8 is molded, the translucent resins 6 and 7 are sealed inside the opaque resin case 8, and thus the lead frames 2, the light emitting chip 3, the light receiving chip 4, and so on are combined into a single unit by the opaque resin case 8. Further, a connector 9 is fixed to one side wall 8a of the opaque resin case 8, and a translucent resin case 10 is placed over and secured to the opaque resin case 8.

The opaque resin case 8 surrounds the light emitting chip 3 and the light receiving chip 4 with the side walls 8a in four directions, and blocks the light emitting chip 3 from the light receiving chip 4 with a barrier 8b. The light emitting chip 3 and the light receiving chip 4 are arranged in chambers 8c and 8d, respectively, of the opaque resin case 8, such that light emitted from the light emitting chip 3 does not directly enter light receiving elements 4a and 4b described below of the light receiving chip 4, and ambient light does not readily enter the light receiving elements 4a and 4b of the light receiving chip 4.

Portions of the translucent resins 6 and 7 are collimating lenses 6a and 7a, respectively. One light emitting element 3a is mounted on the light emitting chip 3, and light from this light emitting element 3a is emitted in the direction of arrow B through the collimating lens 6a of the translucent resin 6 and the translucent resin case 10.

The two light receiving elements 4a and 4b are mounted on the light receiving chip 4, the light emitted from light emitting chip 3 is reflected in the direction of arrow C off a moving object 11 when the moving object 11 moves in front of the moving object detecting photointerrupter 1, and the reflected light enters at least one of the light receiving elements 4a and 4b of the light receiving chip 4 via the translucent resin case 10 and the collimating lens 7a of the translucent resin 7. When the moving object 11 is not present in front of the moving object detecting photointerrupter 1, the light emitted from the light emitting chip 3 is not reflected off the moving object 11 and does not enter the light receiving chip 4.

The collimating lens 6a focuses and emits light from the light emitting chip 3, and the collimating lens 7a focuses light reflected off the moving object 11 onto the light receiving chip 4. When the light from the light emitting chip 3 is focused by the collimating lens 6a, the emission range of light from the light emitting chip 3 becomes narrower and the light image on the moving object 11 becomes smaller and brighter. When the light reflected off the moving object 11 is focused by the collimating lens 7a, the light image on the moving object 11 becomes smaller and brighter on the light receiving chip 4 and its vicinity. For this reason, the detection output from the light receiving elements 4a and 4b of the light receiving chip 4 clearly changes when light enters which is emitted from the light emitting chip 3 and reflected off the moving object 11 and when this light does not enter, the light thereby being able to be detected reliably.

The optical properties of the collimating lenses 6a and 7a are set according to the area of light receiving regions on the light receiving elements 4a and 4b of the light receiving chip 4, such that light reflected off the moving object 11 reliably enters the light receiving regions of the light receiving elements 4a and 4b of the light receiving chip 4 in a sufficient amount.

The areas of the light receiving regions on the light receiving elements 4a and 4b are the same, and a detection output of the same level is output when the same amount of light is received.

Figure 4:
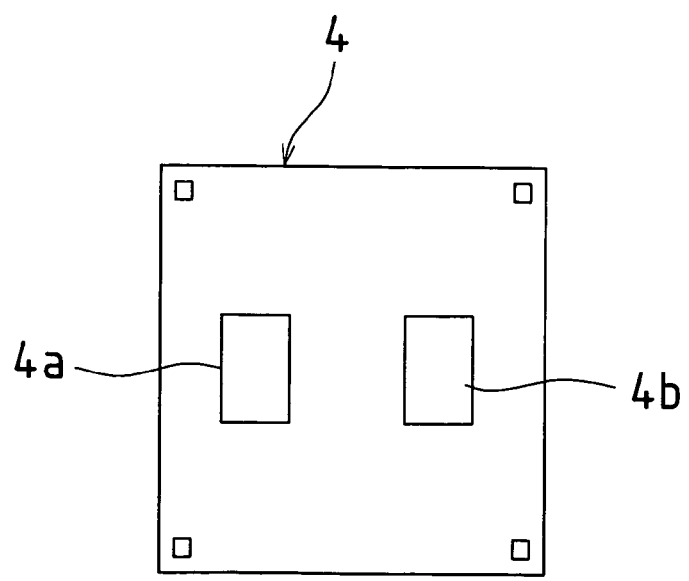
FIG. 4 is a plane view showing the light receiving chip of the moving object detecting photointerrupter of FIG. 1.

The light receiving elements 4a and 4b of the light receiving chip 4 are arranged side by side on the light receiving chip 4 as shown in FIG. 4, and are disposed along a moving direction D of the moving object 11 as shown in FIG. 3.

Figure 5:
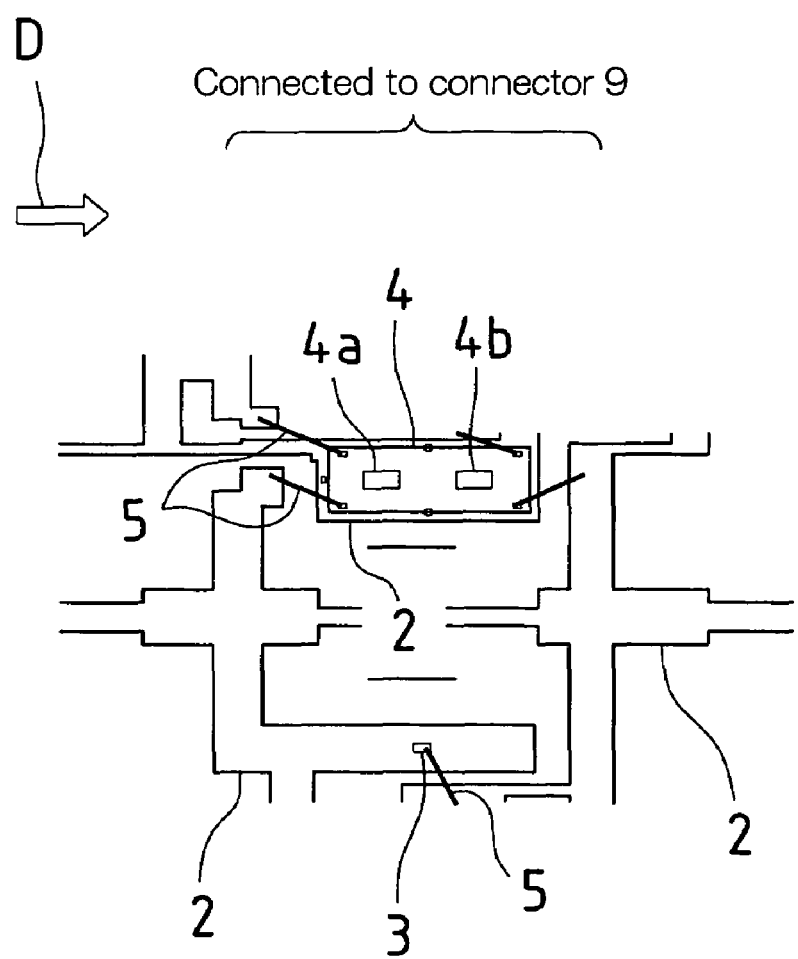
FIG. 5 is a plane view showing the light emitting chip and the light receiving chip on lead frames in the moving object detecting photointerrupter of FIG. 1.

FIG. 5 is a view showing the arrangement of the light emitting chip 3 and the light receiving chip 4 on the lead frames 2. The light emitting chip 3 and the light receiving chip 4 are arranged in a spaced fashion along a direction perpendicular to the moving direction D of the moving object 11 as is clear from FIG. 3 and FIG. 5.

When the moving object 11 is moving in the moving direction D as shown in FIG. 2 and FIG. 3, the moving object 11 first reaches the front of the light receiving element 4a of the light receiving chip 4 and then the moving object 11 reaches the front of the other light receiving element 4b of the light receiving chip 4. Accordingly, light emitted from the light emitting chip 3 is reflected off the moving object 11 that first reached the front of the light receiving element 4a and enters the light receiving element 4a, and then is reflected off the moving object 11 that next reached the front of the light receiving element 4b and enters the light receiving element 4b.

Further, the moving object 11 passes the front of the light receiving element 4a of the light receiving chip 4 and then passes the front of the other light receiving element 4b of the light receiving chip 4. Accordingly, first there is no more light to be reflected off the moving object 11 and enter the light receiving element 4a and then there is no more light to be reflected off the moving object 11 and enter the light receiving element 4b.

Figure 6:
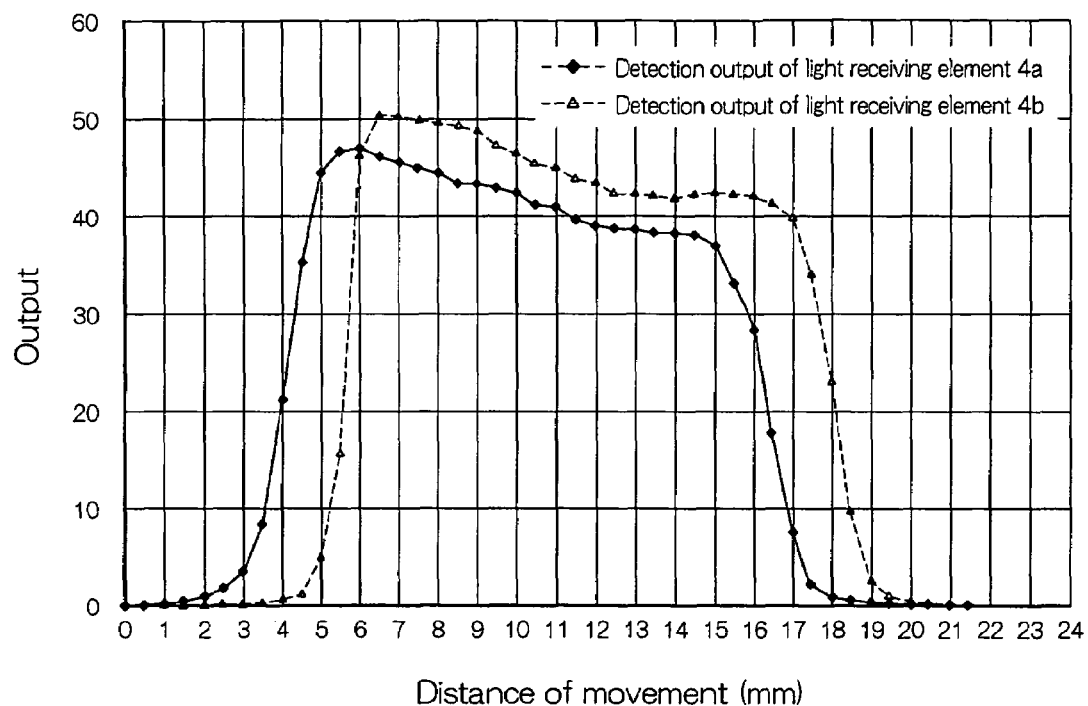
FIG. 6 is a graph showing changes in detection output of the light receiving elements of the light receiving chip when a moving object moves in front of the moving object detecting photointerrupter of FIG. 1.

FIG. 6 is a graph showing changes in the detection output of the light receiving elements 4a and 4b of the light receiving chip 4 when the moving object 11 moves in the moving direction D and passes in front of the moving object detecting photointerrupter 1. Referring to the graph in FIG. 6, when the moving object 11 approaches the front of the moving object detecting photointerrupter 1, the light reflected off the moving object 11 first enters the light receiving element 4a, and therefore the detection output of the light receiving element 4a begins increasing, and then the light reflected off the moving object 11 enters the light receiving element 4b and the detection output from the light receiving element 4b begins increasing.

Next, when the moving object 11 passes and moves away from the front of the moving object detecting photointerrupter 1, the light reflected off the moving object 11 no longer enters the light receiving element 4a, the detection output of the light receiving element 4a begins decreasing, and then the light reflected off the moving object 11 no longer enters the light receiving element 4b and the detection output from the light receiving element 4b begins decreasing.

Note also that in a case in which the moving object 11 moves in the reverse direction of the moving direction D, the moving object 11 first passes the front of the light receiving element 4b of the light receiving chip 4 and then the moving object 11 passes the front of the light receiving element 4a of the light receiving chip 4, and therefore the detection output of the light receiving element 4b rises before the detection output of the light receiving element 4a rises, and furthermore the detection output of the light receiving element 4b decreases before the detection output of the light receiving element 4a decreases.

Accordingly, monitoring changes in the detection output of the light receiving elements 4a and 4b of the light receiving chip 4 makes it possible to detect movement as well as direction of movement of the moving object 11.

Moreover, as described above, the collimating lenses 6a and 7a provide action of clearly changing the detection output of the light receiving elements 4a and 4b of the light receiving chip 4 when the light emitted from the light emitting chip 3 and reflected off the moving object 11 enters and when the light does not enter. This improves the precision of detection of the movement as well as direction of movement of the moving object 11 based on changes in the detection output of the light receiving elements 4a and 4b, and makes detection easier.

The optical properties of the collimating lenses 6a and 7a are set according to the areas of the light receiving regions on the light receiving elements 4a and 4b of the light receiving chip 4, and since the areas of the light receiving regions of the light receiving elements 4a and 4b are the same, this too makes it possible to improve the detection precision of movement as well as direction of movement of the moving object 11, and makes detection easier.

Figure 7:
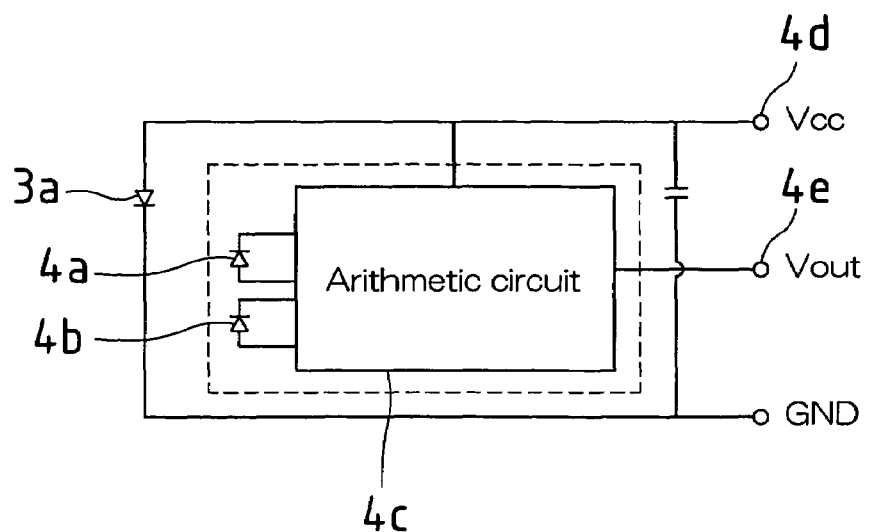
FIG. 7 is a block diagram showing the light emitting element of the light emitting chip, the light receiving elements of the light receiving chip, and an arithmetic circuit in the moving object detecting photointerrupter of FIG. 1.

FIG. 7 is a block diagram showing the light emitting element 3a of the light emitting chip 3 and the light receiving elements 4a and 4b of the light receiving chip as well as the arithmetic circuit 4c of the light receiving chip 4. The light receiving chip 4 includes not only the light receiving elements 4a and 4b but the arithmetic circuit 4c as well. This arithmetic circuit 4c is realized by combining well known logic circuits or using a processor.

The arithmetic circuit 4c of the light receiving chip 4 operates by receiving power supply via a voltage terminal 4d with the power voltage cc, applies a light emission drive signal to the light emitting element 3a of the light emitting chip 3 causing the light emitting element 3a to emit light, monitors changes in the detection output of the light receiving elements 4a and 4b of the light receiving chip 4, detects the movement as well as the direction of movement of the moving object 11, and outputs a voltage signal out from an output terminal 4e showing the detection results.

In more detail, the arithmetic circuit 4c of the light receiving chip 4 samples the detection output separately for the light receiving elements 4a and 4b of the light receiving chip 4 at the timing of a light emission drive signal while applying the light emission drive signal to the light emitting element 3a of the light emitting chip 3, and establishes the detection output of the light receiving elements when the sampled detection output of the light receiving elements matches continuously a plurality of times. The arithmetic circuit 4c detects movement as well as direction of movement of the moving object 11 based on the sequence of changes in the established detection output of the light receiving elements 4a and 4b.

Figure 8:
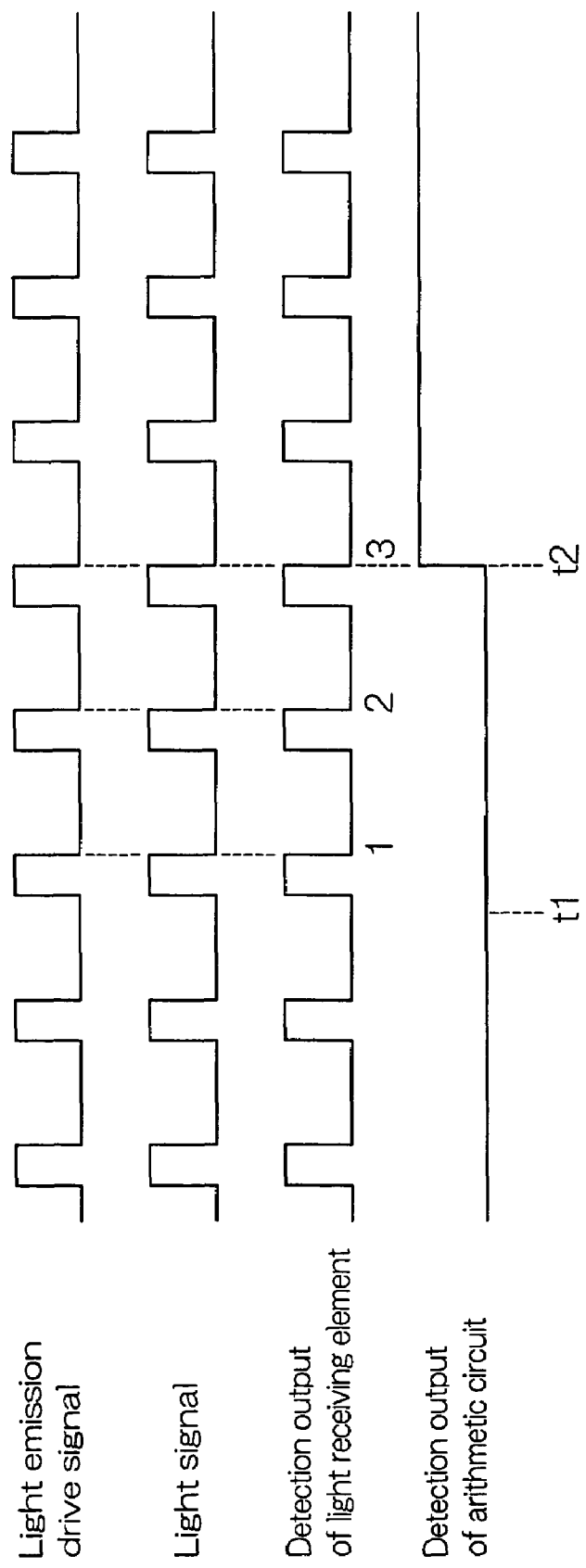
FIG. 8 is a timing chart showing a light emission drive signal and a light signal of the light emitting element, detection output of the arithmetic circuit, and so on in the moving object detecting photointerrupter of FIG. 1.

For example, the light emission drive signal is repeatedly applied to the light emitting element 3a of the light emitting chip 3 from the arithmetic circuit 4c as shown in FIG. 8 and a light signal is emitted from the light emitting element 3a of the light emitting chip 3 each time. At this point, the moving object 11 has not reached the front of the moving object detecting photointerrupter 1 during the period up until time t1, and therefore the light signal from the light emitting chip 3 is not reflected off the moving object 11 and the light signal does not enter either of the light receiving elements 4a or 4b of the light receiving chip 4, and thus the detection output of the light receiving elements 4a and 4b is maintained at low level. In the period up until the time t1, the arithmetic circuit 4c samples the detection output separately for the light receiving elements 4a and 4b in synchronization with the light emission drive signal, and establishes the detection output from the light receiving elements as being low level once the sampled detection output from the light receiving elements is low level three times in a row.

From the time t1, the moving object 11 reaches the front of the moving object detecting photointerrupter 1, the light signal from the light emitting chip 3 is reflected off the moving object 11, the light signal enters at least one of the light receiving elements 4a and 4b of the light receiving chip 4, and the detection output of the light receiving element into which the light signal entered becomes high level. At this time, the arithmetic circuit 4c samples the detection output separately for the light receiving elements 4a and 4b in synchronization with the light emission drive signal, and establishes the detection output from the light receiving elements as being high level starting at a time t2 at which the sampled detection output from the light receiving elements is high level three times in a row.

Furthermore, when the moving object 11 passes the front of the light receiving elements, the light signal reflected off the moving object 11 no longer enters the light receiving elements, and the detection output of the light receiving elements becomes low level, the detection output of the light receiving elements sampled in synchronization with the light emission drive signal is low level three times in a row, and the detection output is established as being low level for the light receiving elements from that time.

Here, when the moving object 11 moves in the moving direction D and reaches the front of the moving object detecting photointerrupter 1, the detection output of the light receiving element 4a becomes high level and then the detection output of the light receiving element 4b becomes high level, as shown by the graph in FIG. 6. Accordingly, the arithmetic circuit 4c samples the detection output of the light receiving elements 4a and 4b at the timing of the light emission drive signal, and when the detection output of, first, the light receiving element 4a is high level three times in a row, the arithmetic circuit 4c establishes that the detection output of the light receiving element 4a is high level at the point in time at which the detection output has been high level three times in a row, and when the detection output of, next, the light receiving element 4b is high level three times in a row, the arithmetic circuit 4c establishes that the detection output of the light receiving element 4b is high level at the point in time at which the detection output has been high level three times in a row.

The arithmetic circuit 4c detects that the moving object 11 is moving in the moving direction D, based on the fact that the detection output of the light receiving element 4a becomes high level and then that the detection output of the light receiving element 4b becomes high level, and outputs from the output terminal 4e the voltage signal out indicating these detection results.

Next, when the moving object 11 moves in the moving direction D and passes the front of the moving object detecting photointerrupter 1, the detection output of the light receiving element 4a becomes low level and then the detection output of the light receiving element 4b becomes low level, as shown by the graph in FIG. 6. Accordingly, the arithmetic circuit 4c samples the detection output of the light receiving elements 4a and 4b at the timing of the light emission drive signal, and when the detection output of, first, the light receiving element 4a is low level three times in a row, the arithmetic circuit 4c establishes that the detection output of the light receiving element 4a is low level at the point in time at which the detection output has been low level three times in a row, and when the detection output of, next, the light receiving element 4b is low level three times in a row, the arithmetic circuit 4c establishes that the detection output of the light receiving element 4b is low level at the point in time at which the detection output has been low level three times in a row.

The arithmetic circuit 4c detects that the moving object 11 is not present in front of the moving object detecting photointerrupter 1, based on the fact that the detection output of the light receiving element 4a becomes low level and then that the detection output of the light receiving element 4b becomes low level, and outputs from the output terminal 4e the voltage signal out indicating these detection results.

Next, when the moving object 11 moves in the reverse direction of the moving direction D and reaches the front of the moving object detecting photointerrupter 1, first the detection output of the light receiving element 4b becomes high level and then the detection output of the light receiving element 4a becomes high level. Accordingly, the arithmetic circuit 4c establishes that the detection output of the light receiving element 4b is high level at the point in time at which the detection output of the light receiving element 4b is high level three times in a row, and next establishes that the detection output of the light receiving element 4a is high level at the point in time at which the detection output of the light receiving element 4a is high level three times in a row. The arithmetic circuit 4c detects that the moving object 11 is moving in the reverse direction of the moving direction D based on the sequence in which the detection output of the light receiving elements 4a and 4b becomes high level, and outputs from the output terminal 4e the voltage signal out indicating these detection results.

Next, when the moving object 11 moves in the reverse direction of the moving direction D and passes the front the moving object detecting photointerrupter 1, first the detection output of the light receiving element 4b becomes low level and then the detection output of the light receiving element 4a becomes low level. At this time, the arithmetic circuit 4c first establishes that the detection output of the light receiving element 4b is low level once the detection output of the light receiving element 4b is low level three times in a row, and then establishes that the detection output of the light receiving element 4a is low level once the detection output of the light receiving element 4a is low level three times in a row. The arithmetic circuit 4c detects that the moving object 11 is not present in front of the moving object detecting photointerrupter 1 based on the fact that the detection output of the light receiving elements 4b and 4a becomes low level in sequence, and outputs from the output terminal 4e the voltage signal out indicating these detection results.

In this way, the detection output of the light receiving elements is sampled at the timing of the light emission drive signal separately for the light receiving elements 4a and 4b of the light receiving chip 4, the detection output of the light receiving elements is established when the sampled detection output of the light receiving elements matches three times in a row, the movement as well as direction of movement of the moving object 11 is detected based on the sequence of changes in the established detection output of the light receiving elements 4a and 4b, and the detection results are output.

However, even when the arithmetic circuit 4c of the light receiving chip 4 samples the detection output of the light receiving elements at the timing of the light emission drive signal, unless the sampled detection output of the light receiving element matches a plurality of times, the detection output of that light receiving element is not established.

Figure 9:
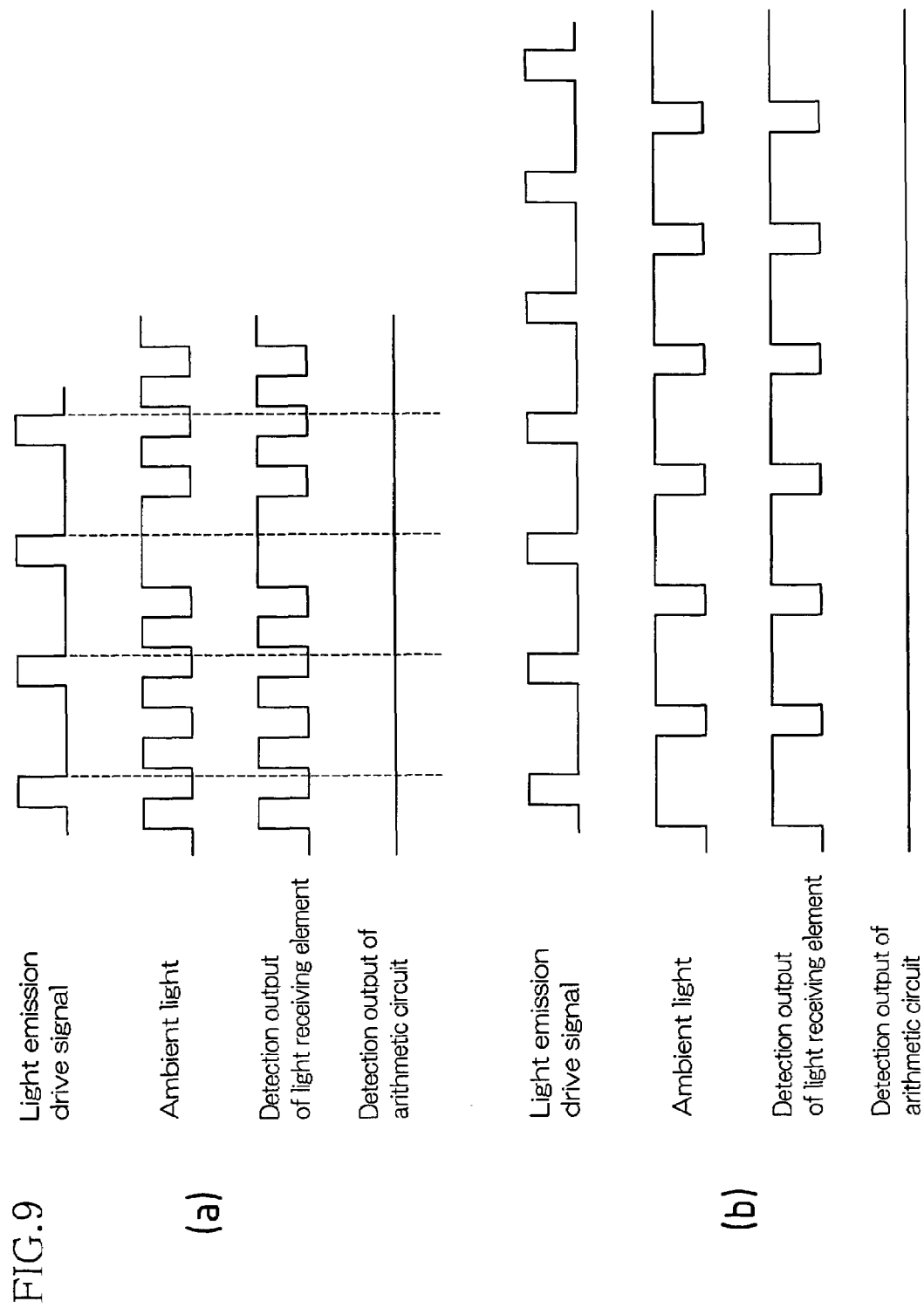
FIG. 9(a) and FIG. 9(b) are timing charts showing the light emission drive signal of the light emitting element, ambient light, the detection output of the arithmetic circuit, and so on in the moving object detecting photointerrupter of FIG. 1.
Figure 10:
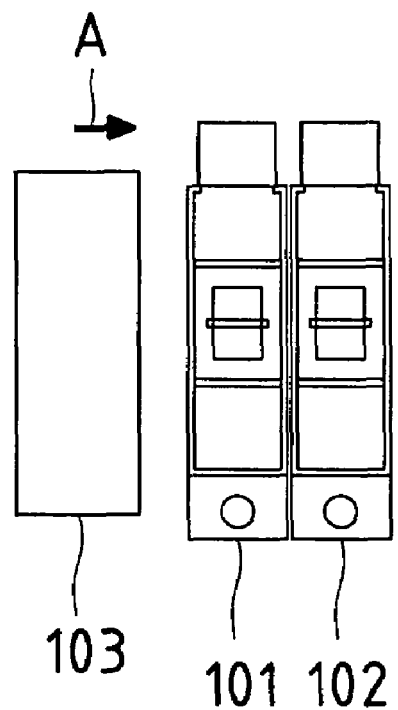
FIG. 10 is a plane view showing a conventional device in which two sensors have been arranged side by side.
Figure 11:
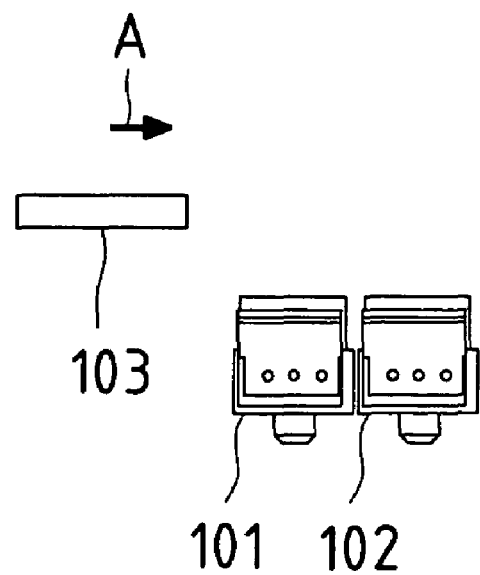
FIG. 11 is a front view showing the device of FIG. 10.
Figure 12:
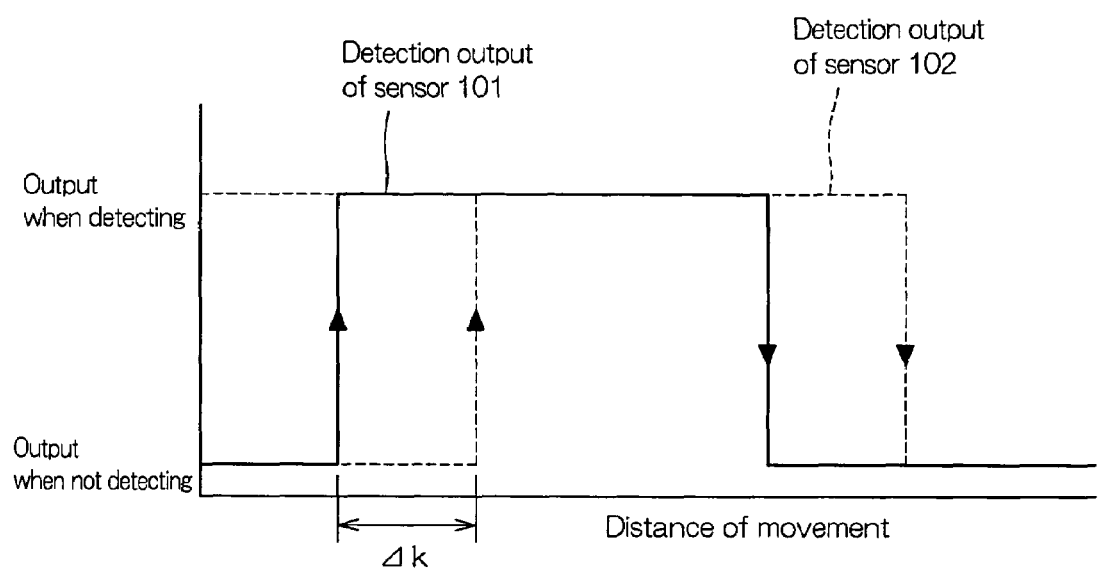
FIG. 12 is a graph showing the detection output of each sensor in the device of FIG. 10.

For example, assuming ambient light that is not synchronized with the light emission drive signal enters the light receiving elements 4a and 4b of the light receiving chip 4 as shown in FIG. 9(a), even when the arithmetic circuit 4c samples the detection output of the light receiving elements 4a and 4b separately in synchronization with the light emission drive signal, but the sampled detection output of the light receiving elements will not be high level three times in a row or low level three times in a row, and therefore the detection output of the light receiving elements will not be established.

Alternately, even if the ambient light is in synchronization with the light emission drive signal as shown in FIG. 9(b), the detection output of the light receiving elements will not be established if the ambient light is wider than the light emission drive signal by a fixed width. The arithmetic circuit 4c samples the detection output of the light receiving elements and if the sampled detection output is greater than a set width, the detection output of the light receiving elements will not be established even if the detection output of the light receiving elements matches three times in a row.

When ambient light with a timing that does not match the light emission drive signal as shown in FIG. 9(a) or FIG. 9(b) enters the light receiving elements, the arithmetic circuit 4c does not establish the detection output of the light receiving elements and maintains the voltage signal out indicating the previous detection results, because even though the detection output of the light receiving elements is sampled in synchronization with the light emission drive signal, the sampled detection output level of the light receiving elements does not match three times in a row or the detection output of the light receiving elements is greater than a set width. Conversely, instead of maintaining the previous detection results, a voltage signal out indicating that the moving object 11 cannot be detected or is not detected is output from the output terminal 4e.

The light emitted from the light emitting element 3a of the light emitting chip 3 and reflected off the moving object 11 is thereby detected without being affected by ambient light, and movement of the moving object 11 can be detected.

As described above, with the moving object detecting photointerrupter 1 of the present embodiment, not only the presence but also the movement as well as direction of movement of the moving object 11 can be detected through a combination of the one light emitting element 3a of the light emitting chip 3 and the two light receiving elements 4a and 4b of the light receiving chip 4, thus reducing the number of light emitting elements compared to conventional cases in which two pairs of light emitting elements and light receiving elements are used. With this reduction in the number of light emitting elements, suppressing a large size of the moving object detecting photointerrupter 1 is possible even if the one light emitting element 3a, the two light receiving elements 4a and 4b, and the arithmetic circuit 4c are combined into a single unit, making it easier to combine the moving object detecting photointerrupter 1 into a single unit. It is therefore possible to suppress an increase in the number of parts, complexity of structure, complexity of design, an increase of installation space, complexity of assembly and tuning, an increase in cost, and so on.

Incidentally, with the above embodiment, the moving direction D of the moving object 11 is detected based on the sequence in which the detection output of the light receiving elements 4a and 4b becomes high level, or in other words the difference in the light reception start timings of the light receiving elements 4a and 4b, but it is also possible to detect the movement as well as direction of movement of the moving object 11 only when the difference between the light reception start timings of the light receiving elements 4a and 4b is equal to or greater than a prescribed value.

It is also possible to detect the movement as well as the direction of movement of the moving object 11 only when the difference between the light reception start timings of the light receiving elements 4a and 4b falls within a prescribed range. In this case, only the movement and direction of movement of the moving object 11 that is moving within a set speed range are detected.

Further, it is also possible to detect the movement of the moving object 11 only when the sequence of the light reception start timings of the light receiving elements 4a and 4b matches a prescribed sequence. In this case, only movement in one direction of the moving object 11 is detected, and movement in the reverse direction is not detected.

In the description so far, the movement and direction of movement of the moving object 11 have been detected when the detection output of the light receiving elements 4a and 4b of the light receiving chip 4 becomes high level, but it is also possible to perform such detection when the detection output of the light receiving elements 4a and 4b of the light receiving chip 4 becomes low level.

For example, when the moving object 11 moves in the moving direction D and passes the front of the moving object detecting photointerrupter 1, the detection output of the light receiving element 4a becomes low level and then the detection output of the light receiving element 4b becomes low level, as shown by the graph in FIG. 6. Accordingly, the arithmetic circuit 4c samples the detection output of the light receiving elements 4a and 4b at the timing of the light emission drive signal, and when the detection output of, first, the light receiving element 4a is low level three times in a row, the arithmetic circuit 4c establishes that the detection output of the light receiving element 4a is low level at the point in time at which the detection output has been low level three times in a row, and when the detection output of, next, the light receiving element 4b is low level three times in a row, the arithmetic circuit 4c establishes that the detection output of the light receiving element 4b is low level at the point in time at which the detection output has been low level three times in a row.

The arithmetic circuit 4c detects that the moving object 11 has moved in the moving direction D, based on the fact that the detection output of the light receiving element 4a becomes low level and then that the detection output of the light receiving element 4b becomes low level, and outputs from the output terminal 4e the voltage signal out indicating these detection results.

It is possible not only to detect the moving direction D of the moving object 11 based on the sequence in which the detection output of the light receiving elements 4a and 4b becomes low level, or in other words the sequence of the light reception end timings of the light receiving elements 4a and 4b, but also to detect the movement as well as direction of movement of the moving object 11 only when the difference between the light reception end timings of the light receiving elements 4a and 4b is equal to or greater than a prescribed value, by obtaining the difference between the light reception end timings.

It is also possible to detect the movement as well as the direction of movement of the moving object 11 only when the difference between the light reception end timings of the light receiving elements 4a and 4b falls within a prescribed range. In this case, only the movement and direction of movement of the moving object 11 that is moving within a set speed range are detected.

Further, it is also possible to detect the movement of the moving object 11 only when the sequence of the light reception end timings of the light receiving elements 4a and 4b matches a prescribed sequence. In this case, only movement in one direction of the moving object 11 is detected, and movement in the reverse direction is not detected.

It is also possible to obtain the light reception start timing and the light reception end timing of the light receiving elements 4a and 4b and detect the movement and direction of movement of the moving object 11 based on the light reception start timing and the light reception end timing. For example, only when the sequences of the light reception start timings and the sequence of the light reception end timings of the light receiving elements 4a and 4b match, the direction of movement of the moving object 11 is detected based on this sequence. The precision with which the direction of movement of the moving object 11 is detected can thereby be improved.

Furthermore, it is also possible to use light receiving elements with a plurality of smaller light receiving regions (light receiving elements) as the light receiving elements 4a and 4b of the light receiving chip 4, and average the detection output of these smaller light receiving regions separately for the light receiving elements 4a and 4b. Variation in the detection output of the amount of light received of the light receiving elements 4a and 4b can thereby be suppressed.

Note that the technology presented herein is no limited to the above embodiments, and may be varied in many ways. For example, a variety of elements may be used as the light emitting element and the light receiving elements. Further, the detection output of the light receiving elements can be sampled at either the rising edge or the falling edge of the light emission drive signal. Moreover, the level of the detection output of the light receiving elements is established when the level of the detection output of the light receiving elements matches three times in a row, but the number of times may be changed as appropriate.

The example embodiment presented herein includes not only the moving object detecting photointerrupter, but also electronic devices using this moving object detecting photointerrupter. The electronic devices include office automation equipment such as photocopiers, factory automation equipment, general household appliances, and so on.

With this electronic device, the same action and effects as the moving object detecting photointerrupter of the example embodiment presented herein can be achieved.

The example embodiment presented herein can be embodied and practiced in other different forms without departing from the spirit, gist, and essential characteristics thereof. Therefore, the above-described embodiments are considered in all respects as illustrative and not restrictive. The scope is indicated by the appended claims rather than by the foregoing description. All variations and modifications falling within the equivalency range of the appended claims are intended to be embraced therein.

What is claimed is:

1. A moving object detecting photointerrupter comprising, one light emitting element for emitting light,
at least two light receiving elements for receiving and detecting said light emitted from the light emitting element which is subsequently reflected off a moving object, wherein said moving object moves relatively to said two light receiving elements, and
detecting programmed logic circuitry for detecting movement of the moving object based on detection output from the light receiving elements when the light reflected off the moving object is received, wherein the detecting programmed logic circuitry obtains a difference in light reception start timings of the light receiving elements receiving light reflected off the moving object based on the detection output of the light receiving elements, and detects movement of the moving object when the difference in the light reception start timings is equal to or greater than a prescribed value.

2. A moving object detecting photointerrupter comprising, one light emitting element for emitting light,
at least two light receiving elements for receiving and detecting said light emitted from the light emitting element which is subsequently reflected off a moving object, wherein said moving object moves relatively to said two light receiving elements, and
detecting programmed logic circuitry for detecting movement of the moving object based on detection output from the light receiving elements when the light reflected off the moving object is received, wherein the detecting programmed logic circuitry obtains a difference in light reception start timings of the light receiving elements receiving light reflected off the moving object based on the detection output of the light receiving elements, and detects movement of the moving object when the difference in the light reception start timings falls within a prescribed range.

3. A moving object detecting photointerrupter comprising, one light emitting element for emitting light,
at least two light receiving elements for receiving and detecting said light emitted from the light emitting element which is subsequently reflected off a moving object, wherein said moving object moves relatively to said two light receiving elements, and detecting programmed logic circuitry for detecting movement of the moving object based on detection output from the light receiving elements when the light reflected off the moving object is received, wherein the detecting programmed logic circuitry obtains a difference in light reception end timings of the light receiving elements receiving light reflected off the moving object based on the detection output of the light receiving elements, and detects movement of the moving object when the difference in the light reception end timings is equal to or greater than a prescribed value.

4. A moving object detecting photointerrupter comprising, one light emitting element for emitting light, at least two light receiving elements for receiving and detecting said light emitted from the light emitting element which is subsequently reflected off a moving object, wherein said moving object moves relatively to said two light receiving elements, and detecting programmed logic circuitry for detecting movement of the moving object based on detection output from the light receiving elements when the light reflected off the moving object is received, wherein the detecting programmed logic circuitry obtains a difference in light reception end timings of the light receiving elements receiving light reflected off the moving object based on the detection output of the light receiving elements, and detects movement of the moving object when the difference in the light reception end timings falls within a prescribed range.

5. A moving object detecting photointerrupter comprising, one light emitting element for emitting light, at least two light receiving elements for receiving and detecting said light emitted from the light emitting element which is subsequently reflected off a moving object, wherein said moving object moves relatively to said two light receiving elements, and detecting programmed logic circuitry for detecting movement of the moving object based on detection output from the light receiving elements when the light reflected off the moving object is received, wherein the detecting programmed logic circuitry obtains light reception start timings of the light receiving elements and light reception end timings of the light receiving elements receiving light reflected off the moving object based on the detection output of the light receiving elements, and detects movement of the moving object based on the light reception start timings and the light reception end timings.

6. A moving object detecting photointerrupter comprising, one light emitting element for emitting light, at least two light receiving elements for receiving and detecting said light emitted from the light emitting element which is subsequently reflected off a moving object, wherein said moving object moves relatively to said two light receiving elements, and detecting programmed logic circuitry for detecting movement of the moving object based on detection output from the light receiving elements when the light reflected off the moving object is received, wherein the detecting programmed logic circuitry detects the movement of the moving object based on the detection output of the light receiving elements when light emitting timing of the light emitting element and light reception timings of the light receiving elements match continuously a plurality of times.

7. The moving object detecting photointerrupter according to claim 1, or claim 2, or claim 3, or claim 4, or claim 5, or claim 6, wherein the areas of light receiving regions of the light receiving elements are the same.

8. The moving object detecting photointerrupter according to claim 1, or claim 2, or claim 3, or claim 4, or claim 5, or claim 6, wherein an optical system is set for each of the light receiving elements in accordance with the area of the light receiving region of each of the light receiving elements.

9. The moving object detecting photointerrupter according to claim 1, or claim 2, or claim 3, or claim 4, or claim 5, or claim 6, wherein the light receiving elements have a plurality of light receiving regions.

10. The moving object detecting photointerrupter according to claim 1, or claim 2, wherein the detecting programmed logic circuitry detects the movement of the moving object based on the detection output of the light receiving elements regardless of the sequence of the light reception start timings of the light receiving elements receiving light reflected off the moving object.

11. The moving object detecting photointerrupter according to claim 1, or claim 2, wherein the detecting programmed logic circuitry obtains the sequence of the light reception start timings of the light receiving elements receiving light reflected off the moving object based on the detection output of the light receiving elements, and detects the direction of movement of the moving object based on the sequence.

12. The moving object detecting photointerrupter according to claim 1, or claim 2, wherein the detecting programmed logic circuitry obtains the sequence of the light reception start timings of the light receiving elements receiving light reflected off the moving object based on the detection output of the light receiving elements, and detects movement of the moving object only when the sequence matches a prescribed sequence.

13. The moving object detecting photointerrupter according to claim 1, or claim 2, or claim 3, or claim 4, or claim 5, or claim 6, wherein a collimating lens is provided to the light-emitting side of the light emitting element or the light-incident side of the light receiving elements.

14. An electronic device, wherein the moving object detecting photointerrupter according to claim 1, or claim 2, or claim 3, or claim 4, or claim 5, or claim 6, is used.

15. The moving object detecting photointerrupter according to claim 3 or claim 4, wherein the detecting programmed logic circuitry detects the movement of the moving object based on the detection output of the light receiving elements regardless of the sequence of the light reception end timings of the light receiving elements receiving light reflected off the moving object.

16. The moving object detecting photointerrupter according to claim 3 or claim 4, wherein the detecting programmed logic circuitry obtains the sequence of the light reception end timings of the light receiving elements receiving light reflected off the moving object based on the detection output of the light receiving elements, and detects the direction of movement of the moving object based on the sequence.

17. The moving object detecting photointerrupter according to claim 3 or claim 4, wherein the detecting programmed logic circuitry obtains the sequence of the light reception end timings of the light receiving elements receiving light reflected off the moving object based on the detection output of the light receiving elements, and detects movement of the moving object only when the sequence matches a prescribed sequence.

18. The moving object detecting photointerrupter according to claim 6, wherein the detecting programmed logic circuitry maintains a detection state if a high-frequency light that does not match the light reception timing enters when the light emitting timing of the light emitting element and the light reception timings of the light receiving elements match.

19. The moving object detecting photointerrupter according to claim 6, wherein the detecting programmed logic circuitry does not detect the movement of the moving object if a high-frequency light that does not match the light reception timing enters when the light emitting timing of the light emitting element and the light reception timings of the light receiving elements match.

* * * * *